United States Patent [19]

Ondrik

[11] Patent Number: 4,712,007
[45] Date of Patent: Dec. 8, 1987

[54] PULSED NEUTRON LOGGING METHOD USING CUMULATIVE COUNT CURVES

[75] Inventor: Michael A. Ondrik, Albuquerque, N. Mex.

[73] Assignee: S.I.E., Inc., Fort Worth, Tex.

[21] Appl. No.: 718,521

[22] Filed: Apr. 1, 1985

[51] Int. Cl.$^4$ .............................................. G01V 5/10
[52] U.S. Cl. .................................. 250/270; 250/256; 250/261; 250/262
[58] Field of Search ............... 250/256, 261, 265, 270, 250/262

[56] References Cited

U.S. PATENT DOCUMENTS

| | | | |
|---|---|---|---|
| 3,379,884 | 4/1968 | Youmans | 250/83.3 |
| 3,435,216 | 3/1969 | Givens | 250/83.1 |
| 3,609,366 | 9/1971 | Schwartz | 250/83.3 |
| 4,122,338 | 10/1978 | Smith, Jr. et al. | 250/262 |
| 4,239,965 | 12/1980 | Oliver et al. | 250/270 |
| 4,317,034 | 2/1982 | Randall | 250/262 |
| 4,409,481 | 10/1983 | Smith, Jr. et al. | 250/270 |

OTHER PUBLICATIONS

TDT-K-Schlumberger Surenco Training Program-Course L-13, Thermal Decay Tool-pp. 1-21-- Jan. 1976.

"A New Thermal Neutron Decay Logging System-TDT-M", pp. 199-207-Jan., 1982.
"1. Basic Concepts of the TMD measurements", pp. 1-8.

Primary Examiner—Craig E. Church
Assistant Examiner—David P. Porta
Attorney, Agent, or Firm—James E. Bradley

[57] ABSTRACT

A method of measuring earth formation characteristics using a pulsed neutron source computes the characteristics by using a cumulative count curve. A pulsed neutron source and detector are pulled upwardly through a borehole. The pulsed neutron source repetitively irradiates the earth formations with pulses of fast neutrons from the neutron source, creating thermal neutrons due to collisions in the formations. Detectors in the downhole instrument detect gamma rays emanating from the irradiated formations as a result of the capture of thermal neutrons. The gamma rays are cumulatively counted in a plurality of separate time bins between each of neutron pulses. The cumulative counts define points on a cumulative count versus time curve which has a mathematical expression. Count data is transmitted to a surface panel, which uses iterative least squares fit techniques to calculate the formation lifetime decay constant. The processor changes the pulse firing rate every two inch depth increment based on the new formation lifetime constant calculated.

5 Claims, 7 Drawing Figures

PULSED NEUTRON LOGGING METHOD USING CUMULATIVE COUNT CURVES

CROSS-REFERENCE TO RELATED APPLICATIONS

This application is being filed concurrently with the following applications and contains common subject matter in the specification:

| Serial No. | Inventor | Title |
| --- | --- | --- |
| 718514 | H. Jacob Tausch, Jr. and L. David McDaniel | DEPTH FILTER METHOD FOR SERVO CONTROL IN WELL LOGGING |
| 718511 | H. Jacob Tausch, Jr. | METHOD FOR SYNCHRONIZING COMMAND AND RESPONSE SIGNALS IN WELL LOGGING | both now abandoned.

BACKGROUND OF THE INVENTION

1. Field of the Invention

This invention relates in general to wireline logging of oil wells, and in particular to a method of pulsed neutron logging for determining earth formation characteristics.

2. Description of the Prior Art

In pulsed neutron logging, a downhole instrument is lowered into a well on a conductor cable. The downhole instrument has a pulsed neutron source and two gamma ray detectors spaced above the neutron source. As the downhole instrument is pulled slowly upward, the neutron source is pulsed or fired to cause a cloud of neutrons to be emitted to irradiate the formation. The neutrons are slowed down by collisions in the formation, particularly by hydrogen if present. Once they reach a state known as thermal neutrons, some will be captured. Chlorine nuclei capture the neutrons much more readily than other elements present. Once captured, the nuclei become excited, and emit gamma rays for a short period of time. The gamma rays are detected by the two scintillation counters.

A pulse of neutrons will be followed by a time period in which the gamma rays are received by the detectors. The rate at which the counts per second decay is a function of the formation thermal decay time. The ratio of the two detectors can be used to calculate the porosity, while the formation thermal decay time can be used to calculate other earth formation characteristics, such as the water saturation.

The decay rate is exponential down to a constant background rate. The background rate is the count rate that exists due to gamma rays being detected by the counter that did not emanate as a result of neutron capture. This background rate depends upon the formation and to a large extent on the downhole tool itself, which becomes activated by the neutron radiation.

Different methods are used to compute earth formation characteristics from the decay rate curve. An equation can be used to express the decay rate curve, but it will have unknown variables which include the background count rate, the formation lifetime or decay constant, and at a time equal zero, the number of excited nuclei or the count rate. One technique divides the sampling time following each pulse into time gates, then assumes that the last one or two time gates in the sampling period represent count rates due only to background. A second technique periodically turns off the neutron source for a period in which the background is measured. In both cases, once the background is known, the other variables are computed using various techniques. Both, however, make assumptions of the background, which can lead to errors.

SUMMARY OF THE INVENTION

In this invention, rather than use the count rate curve to determine the formation characteristics, a cumulative count is made. Following each pulse, a sampling period occurs, which is divided into a number of gates or time bins. The total counts of gamma rays received at the conclusion of each bin is added to the next succeeding bin. In this manner, a cumulative curve which exponentially increases in time will occur. After a selected interval, the totals for each bin are averaged by the number of neutron pulses that occured during the interval. The average cumulative totals thus represent points on a cumulative curve versus time graph. The cumulative curve has a mathematical expression which has three unknown variables.

The data is periodically transmitted to the surface. A processor, using a least squares iterative fit computes the three variables based on the points provided by the data. The processor assumes starting values for the three variables, based on preceding data and iteratively calculates new values until the errors are minimized between the new data points and the theoretical curve. Once the proper values are computed, a thermal decay time, also known as formation lifetime constant, is calculated. In the preferred embodiment, the processor then varies the neutron pulse firing rate so that its duration is equal to the formation lifetime constant calculated for the previous depth increment.

DESCRIPTION OF THE PREFERRED EMBODIMENT

Figure 1:
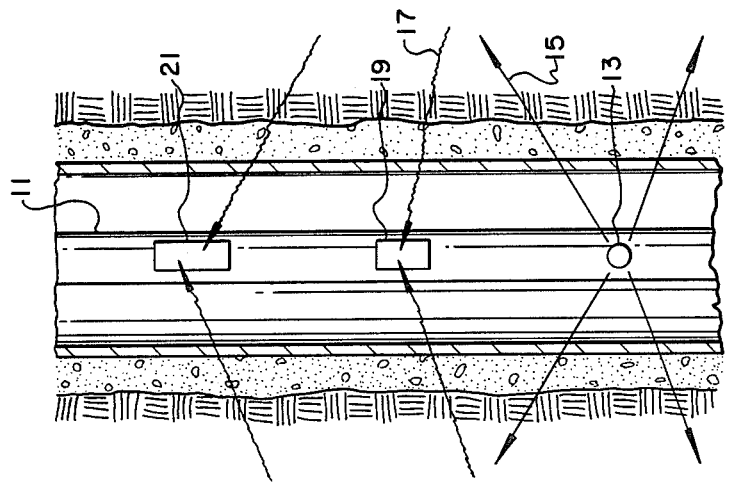
FIG. 1 is a schematic representing a portion of a downhole instrument of a pulsed neutron logging system.

Referring to FIG. 1, a downhole instrument 11 has a pulsed neutron source 13 of a conventional type. Source 13 causes a burst of high energy 14 MEV fast neutrons to irradiate the formation, as indicated by the arrows 15. The neutrons are slowed down to the thermal energy range through collisions with neuclei in the tool, borehole, and formation. The presence of hydrogen in the formation particularly causes the neutrons to lose energy. As the thermal neutrons are captured, gamma rays, indicated by arrows 17 are generated. The affinity for neutrons to be captured by the elements is described in terms of neutron capture cross-section. Chlorine has a high capture cross-section, and is found in formation waters. The quantity of chlorine present is proportional to the amount of water and porosity, thus the water saturation can be calculated if the porosity is known.

Some of the gamma rays generated by the excited nuclei will be detected by the near and far or scintillation detectors 19 and 21. The size of the thermal neutron cloud is determined primarily by how much energy each neutron loses when it collides with other nuclei. To a large extent, this means that the size of the thermal neutron cloud is a function of the concentration of hydrogen in the formation, since collisions with hydrogen nuclei result in far more energy loss than collisions with other nuclei. Comparing the count rates of the near and far detectors 19 and 21 will indicate the size of the neutron cloud. Dense hydrogen concentration will result in a small thermal neutron cloud, and the count rate from the near detector will be much higher than that of the far detector.

Figure 2:
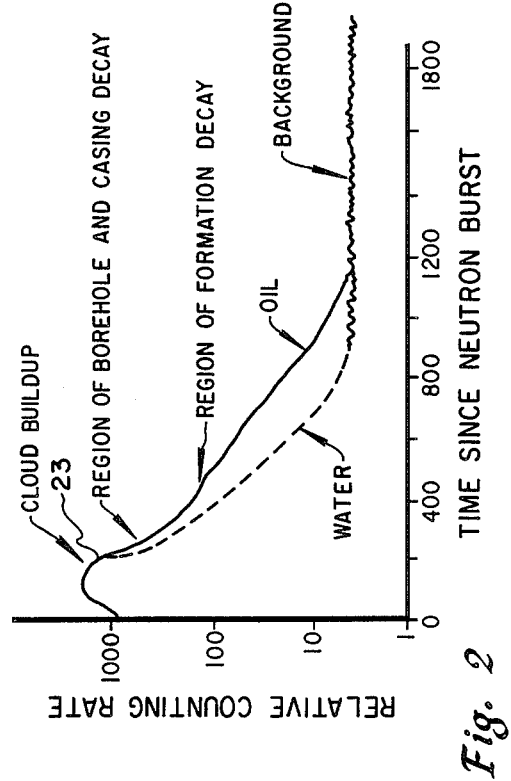
FIG. 2 is a typical curve of gamma ray count rate versus time as a result of a neutron burst.

FIG. 2 illustrates the decay curve 23 in the gamma ray count rate that occurs after each neutron burst. During the cloud buildup, there will be a high count rate. This is followed by a region that represents gamma rays emitted from capture in the borehole and casing. This region is followed by a region of formation decay, which decays down to a background level. The solid line indicates oil, and shows a fairly straight slope, when plotted on semi-log graphs as shown in FIG. 2. If water is present, the decay rate is at a faster slope, because of the higher rate of capture by the chlorine in the water, as indicated by the curve with the dotted line. The background is primarily induced radioactivity in the formation and the tool. The life of this induced radioactivity is very long compared to the thermal decay times, so that the background is fairly constant. The decay curve can be expressed by:

$N = N_0 \lambda e^{-\lambda t} + B$

N=count rate at any time
No=count rate at time=0
$\lambda = 1/\tau$ where $\tau$=formation lifetime or Tau
t=time
B=background count rate In the prior art techniques, the decay rate curve shown in FIG. 2 is used in various manners, normally by dividing the region of formation decay into time gates, to determine the formation lifetime constant tau, which is expressed in microseconds and is also called thermal decay time. It is the time for a thermal neutron population created in a formation to decrease to 37 percent of its original value.

Figure 3:
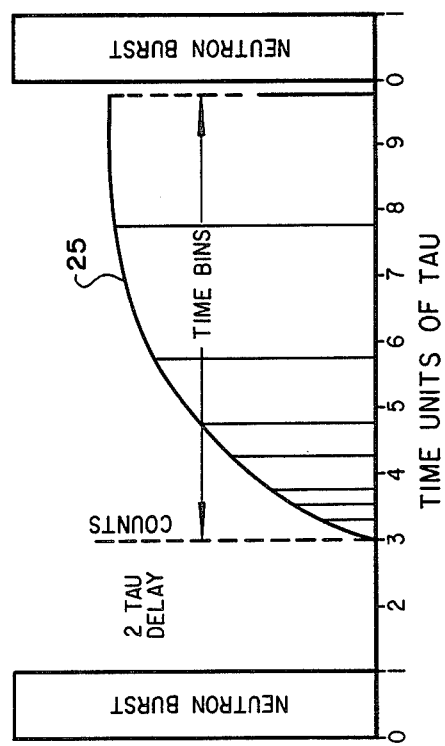
FIG. 3 is a schematic graph illustrating a cumulative gamma ray count curve as a result of a neutron burst.

The method of this invention is illustrated in FIG. 3. The neutron source 13 (FIG. 1) is fired to have a pulse equal to the formation lifetime constant tau calculated for the previous two inch depth increment. The pulse is again fired after the time equal to ten tau. A period equal to two tau is delayed after each burst to delay counting until the cloud buildup and the region of borehole and casing decay has dissipated, as indicated in FIG. 2. Beginning with the third tau, and extending to a point just before the beginning of the next neutron burst, eight time bins are provided. The time bins have different widths ranging from about one fourth tau at the shortest to about two tau at the longest. The last time bin ends shortly before the start of the next neutron burst. The smaller time bins occur in the region of greater change.

The scintillation counters 19 and 21 will detect the gamma rays. The downhole instrument 11 has a counter and microprocessor which will count and store these gamma rays cumulatively beginning with the end of the two tau delay. Every gamma ray received by the detector 19, and every gamma ray received by the detector 21 are separately counted. The instrument 11 adds the count of each bin to the preceding bins, thus making a cumulative total count of all the gamma rays received from the near detector and a separate cumulative total count from the far detector. The count at the end of each time bin will provide a point on the cumulative curve 25 shown in FIG. 3. The neutron source 13 will be pulsed a number of times during the desired depth increment, preferably two inches, and the cumulative count at the end of each bin will be stored.

The pulse firing rate can be varied between 200 and 1200 per second, and will typically be around 500 pulses per second. At normal logging speeds, the two inch increment takes about ¼ second to traverse. At the end of each depth increment, the neutron source 13 will have pulsed normally more than one hundred times. Dividing the total count at the end of each bin by the number of pulses made during the depth increment will provide an average count at that point on curve 25 which will be used in further computations.

The mathematical expression previously shown for the count rate curve 23 can be integrated to arrive at a mathematical expression for the cumulative count curve 25. This results in the equation:

$C_i = PN_0(1 - e^{-\lambda T \gamma i}) + PB\gamma i$ $C_i$=cumulative number of counts at the end of each bin
P=number of pulses fired during each depth increment
$N_0$=count rate from one neutron burst at time=0
$\lambda$=inverse of the formation lifetime $\tau$ or Tau
$\gamma i$=time
T=sampling period given by $$T = \frac{1}{10\, PRF}$$

where PRF is the pulse repetition frequency
B=background count rate

One could calculate the lifetime constant tau from this equation if the other two variables were known, which are the background count rate B and the count rate $N_0$ at time equals zero. These values are not known, but the equation can nevertheless be solved since there are eight points known on the curve. The equation can be solved by a known technique using least squares iterative fit. In solving the equation, the cumulative equation can be expressed more briefly as follows:

$C_i = P_1(1 - e^{-P_2 \gamma i}) + P_3 \gamma i$ $P_1 = PN_0$ Total number of gamma rays due to exponential decay
$P_2 = \lambda T$ inverse of the normalized time constant
$P_3 = PBT$ normalized background The latter equation represents the cumulative distribution in a normalized space. The preferred technique used to solve for the variables in the normalized cumulative equation is called the Jacobian technique. This technique is based on the fact that even complex mathematical functions can be approximated by a straight line over a suitably small range. If a good assumption is made for the starting values of $P_1$, $P_2$, and $P_3$, then the values for these variables can be iteratively refined. In the preferred embodiment, the $P_1$, $P_2$, and $P_3$ variables are initially assumed to be the variables calculated for the preceding two inch depth increment. The Jacobian matrix equation can be expressed as follows:

$$\begin{bmatrix} \Sigma(1-e^{-P_2\gamma_i})^2 & \Sigma\gamma_i e^{-P_2\gamma_i}(1-e^{-P_2\gamma_i}) & \Sigma\gamma_i(1-e^{-P_2\gamma_i}) \\ \Sigma\gamma_i e^{-P_2\gamma_i}(1-e^{-P_2\gamma_i}) & \Sigma(\gamma_i e^{-P_2\gamma_i})^2 & \Sigma\gamma_i^2 e^{-P_2\gamma_i} \\ \Sigma\gamma_i(1-e^{-P_2\gamma_i}) & \Sigma\gamma_i^2 e^{-P_2\gamma_i} & \Sigma\gamma_i^2 \end{bmatrix} \begin{bmatrix} \Delta P_1 \\ P_1 \Delta P_2 \\ \Delta P_3 \end{bmatrix} = \begin{bmatrix} \Sigma ERR(1-e^{-P_2\gamma_i}) \\ \Sigma ERR(\gamma_i e^{-P_2\gamma_i}) \\ \Sigma ERR(\gamma_i) \end{bmatrix}$$

$\Delta P_1$, $\Delta P_2$ and $\Delta P_3$ are the corrections to the P variables to improve the fit.

ERR is the error between measured data and the theoretical value using the initial estimates of $P_1$, $P_2$, and $P_3$.

This is the equation which is used in the system of this invention to calculate the formation tau. The equation is implemented using some coding techniques to increase execution speed. The first technique is to calculate intermediate variables for every data sample. With the assumptions below, the matrix equation becomes as follows:

$$\begin{bmatrix} \Sigma G_i^2 & \Sigma G_i H_i & \Sigma G_i T_i \\ \Sigma G_i H_i & \Sigma H_i^2 & \Sigma H_i T_i \\ \Sigma G_i T_i & \Sigma H_i T_i & \Sigma T_i^2 \end{bmatrix} \begin{bmatrix} \Delta P_1 \\ P_1 \Delta P_2 \\ \Delta P_3 \end{bmatrix} = \begin{bmatrix} \Sigma ERR G_i \\ \Sigma ERR H_i \\ \Sigma ERR T_i \end{bmatrix}$$

$G_i = 1 - e^{-P_2\gamma_i}$
$H_i = \gamma_i e^{-P_2\gamma_i}$
$\gamma_i = T_i$

The second technique is to reduce the number of exponentiations required for each solution. This is done by recognizing the fact that the value of an exponential after a step in time will be the product of the exponential at the beginning of the step times the exponential value of the change:

$$EXP(T+\Delta T) = EXP(T) * EXP(\Delta T)$$

The data collection windows have relative widths of 0.3125 for the first window width and 0.25 for the second window width. Since other window widths are multiples of 0.25, one can define exponential step values as:

STP0 = EXP ($-0.3125 P_2$)
STP1 = EXP ($-0.25 P_2$)
STP2 = STP1 * STP1
STP3 = STP2 * STP2
STP4 = STP3 * STP3

Then the value of the exponentials for the eight time bins can be put in an array "X(i)" as:

X(1) = STP0
X(2) = X(1) * STP1
X(3) = X(2) * STP1
X(4) = X(3) * STP2
X(5) = X(4) * STP2
X(6) = X(5) * STP3
X(7) = X(6) * STP4
X(8) = X(7) * STP4

Note that only two exponentiations are required to generate the eight exponential values.

The required number of mathematical steps is further reduced by recognizing that the matrix is symmetrical about its diagonal. Therefore, only six of the nine array elements need to be calculated. This number is reduced even further since the (3,3) element is the sum of the squares of the normalized sample times. This quantity never changes and can be stored as a constant.

Matrix equations can be solved a number of different ways. The preferred technique herein is known as the "co-factor reduction" method, and will not be described in further detail.

Figure 4:
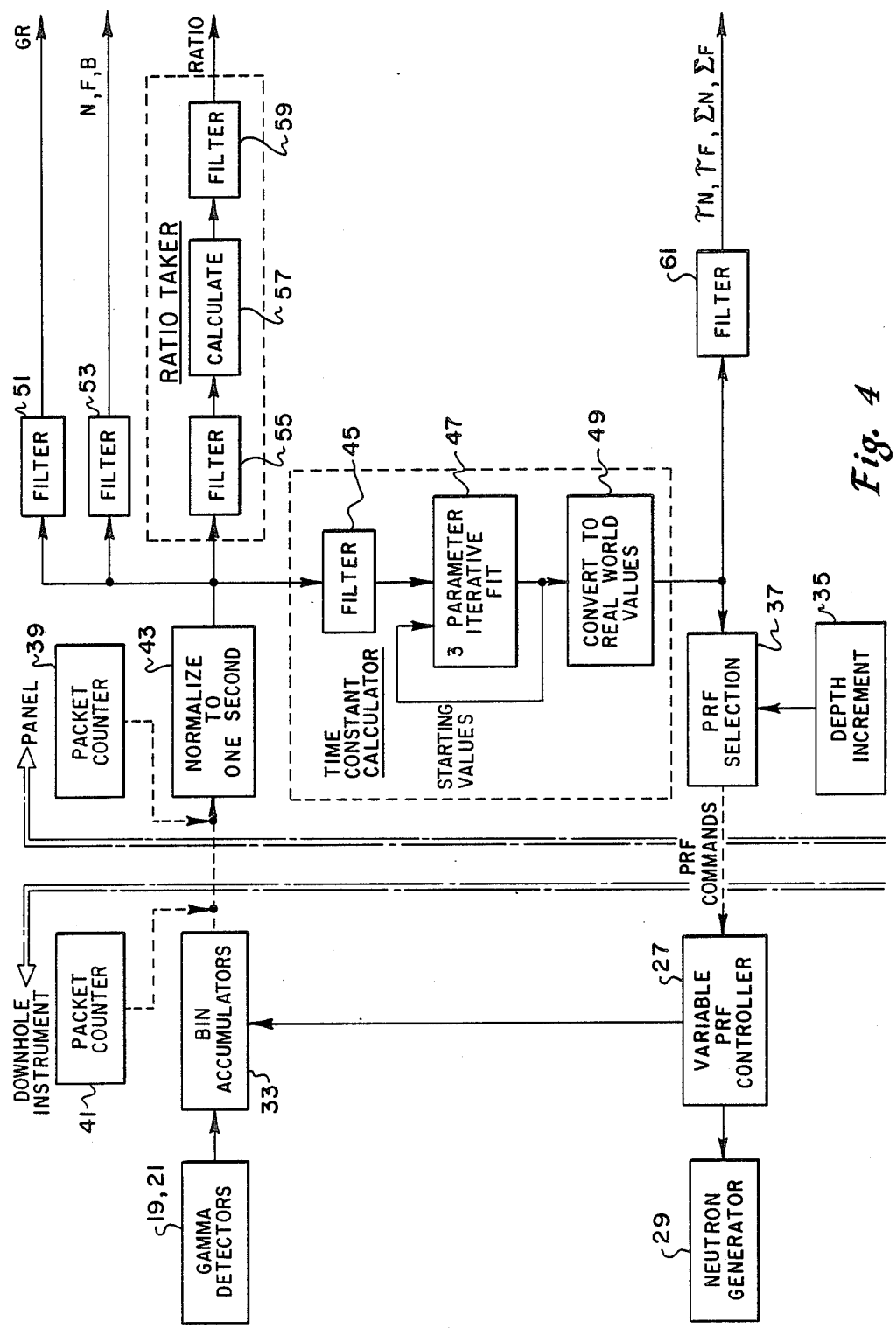
FIG. 4 is a block diagram illustrating the functions of the pulsed neutron logging system of this invention.

The overall operation is illustrated in FIG. 4. A variable PRF controller 27 in the downhole instrument processor varies the pulse repetition firing rate for the neutron generator 29. The controller 27 sets the duration of the burst at one tau, or one formation lifetime constant, with the generator repeating the pulse every ten tau, providing a ten percent duty cycle for the source 13. The controller 27 is located in the downhole instrument 11, and will be commanded by instructions from the surface panel to set the new rate every depth increment, which is preferably two inches. The gamma ray detectors 19,21 are conventional scintillation detectors, which detect gamma rays. After a two tau delay, the gamma rays are counted and stored in a portion of the downhole processor designated as bin accumulators 33. The controller 27 strobes the accumulators 33 for the time bin widths. The relative widths of the time bins will not change with respect to each other, but with the calculation of each new tau, the pulse firing repetition rate and the actual bin widths in real time will change. The accumulators 33 will accumulate the counts for each time bin for the entire two inch depth increment.

A depth increment indicator 35 will be in rotating engagement with the logging cable (not shown), and will provide a signal with each two inches of travel. This signal is applied in the surface panel to a PRF selection section 37. The PRF selection 37 is provided with a new formation tau, and sends a digital message over the cable to the downhole PRF controller 27 to fire the neutron generator 29 at the new rate. Simultaneously, it will send a message in the panel to a packet counter 39. Packet counter 39 is a conventional digital counter that will step to the next number when the message from the PRF selection section 37 is sent down the cable. Each message causes the packet counter 39 to shift to the next number. When the packet counter 39 reaches its maximum number it resets itself to zero and repeats the cycle. Packet counter 39 will retain the number until the next message is sent from the surface panel to the downhole instrument.

When the command message is sent to the PRF controller 27, controller 27 will instruct a separate packet counter 41 located in the downhole instrument 11 to shift to a new digital number. Also, the variable PRF controller 27 will instruct the bin accumulators 33 to forward the data digitally to the surface panel. The message is digitally sent from the instrument 11 to the panel. In the preamble or the first portion of the message, a digital word representing the new number of the downhole packet counter 41 will be inserted. At the surface, a digital comparator in the processor compares the current number of the packet counter 39 with the number sent by the packet counter 41. If the numbers are identical, this indicates that the data for the proper increment has been received. This data, which represents the total counts during the previous two inch increment for each of the time bins, is averaged in the surface processor by dividing the total counts by the number of pulses that occured in the depth increment. The data is normalized to one second as indicated by box 43, because the sampling periods may vary in time from one depth increment to the next depth increment.

This data is then applied to a time constant calculator portion of the processor for calculating a new formation tau. First, so as to reduce statistical variations, the data is filtered by digital filter 45 to smooth the data. This digital filter will be explained in more detail subsequently. Next, values for the three unknown variables are supplied based on the variables calculated during the preceding two inch depth increment. Once these variables are in place, the three parameter iterative fit is cycled through as indicated by box 47. The actual count data is compared with the calculated value based on the assumptions for the three variables until the errors between the assumed and the actual values converge to zero. Background is calculated, not assumed.

These variables are converted to real world values, as indicated by box 49, providing a new formation tau. The new formation tau is applied to the PRF selection step 37. In the PRF selection step 37, input is received from the depth increment 35 to supply the new formation tau downhole to the variable PRF controller 27, repeating the cycle. Consequently, all of the computation by the surface processor will take place in the time that occurs while the tool moves two inches, typically one quarter of a second.

Prior to entering filter 45, and after being normalized to one second as indicated by box 43, the normalized data is also supplied to three filters 51, 53 and 55. These filters are depth filters and will be described in more detail subsequently. The data output from filter 51 is a natural gamma ray output in counts per second. The detector for this output is spaced far enough from detectors 19 and 21 so as to not be influenced above by any radioactive emissions from the downhole instrument. The gamma ray count rate depends only on the formation natural radioactivity.

The output from filter 53 represents count rates from the near and far detectors 19 and 21. The background curves B are the average gamma ray counts for each of the detectors 19 and 21 in the period from 6.78 to 8.78 tau after the end of each of the neutron pulses. These curves are based directly on the tool measurements by taking time bin 8 and scaling the counts to counts per second. These background curves are not used in computing tau, and are recorded for other purposes. The N and F curves herein are the average gamma count rate in the near and far detectors 19 and 21 in the period from two tau to 2.781 tau after the end of each neutron pulse, with the background subtracted. This is determined by the counts taken in the first three time bins, which represents 2 tau to 2.781 tau after the neutron burst.

The ratio taken herein, which is made after filter 55, is the average count rate in the near detector 19 in the first three time bins with background subtracted, divided by the average count rate in the far detector 21 in the first six time bins with background subtracted. The denominator and numerator are scaled for the time intervals. The ratio taker calculates, as indicated by step 57, then filters the output using a depth filter 59. The outputs from the filters 51, 53 and 55 are recorded on a continuous log for evaluation using various methods for calculating formation characteristics.

Filter 61 is a depth filter which receives its input from the time constant calculator. The time constant calculator while calculating the new formation tau, will also calculate the tau from the near detector 19, the tau based on the far detector 21 and the capture cross-sections, sigma, for each detector. Once the three variables are determined by the iterative three parameter fit, as indicated by box 47, the sigma values are calculated in a conventional manner. The capture cross-section is a standard unit of measure which equals 4550 divided by the formation tau. These values are recorded on a continuous log.

Figure 7:
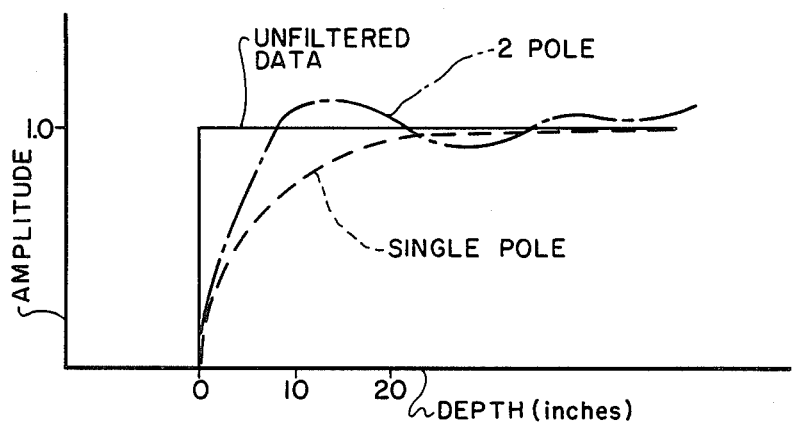
FIG. 7 is a schematic graph illustrating the effects of the filters of FIG. 5 and FIG. 6.

The depth filter 45 is a single pole, digital filter implemented by software. Depth filters 51, 53, 55 and 61 are two pole depth filters, also implemented by software. Referring to FIG. 7, the function of these filters is illustrated by the unfiltered data step input. The single pole filter has a depth constant, preferably four inches. For example, depending on constants selected, if the amplitude actually measured in each two inch increment from zero to twenty inches was one, the output would be reduced, such that it would only approach one after about twenty inches of travel. The convergence of the single pole curve depends upon the constants supplied, and FIG. 7 is not to scale.

Figure 5:
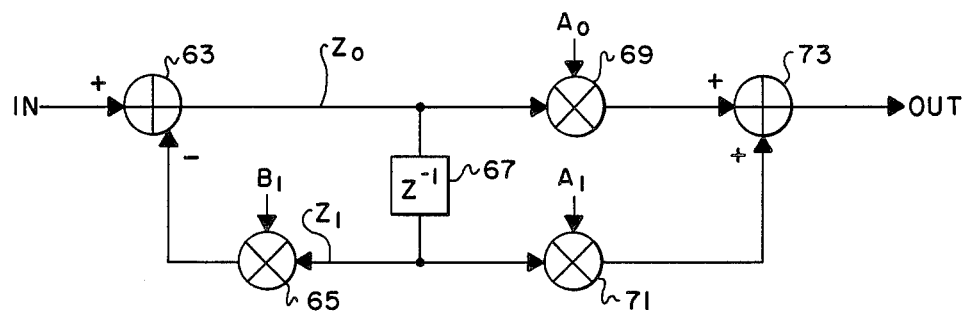
FIG. 5 is a schematic illustrating one of the depth filters used in computing formation characteristics with the system of FIG. 4.

FIG. 5 illustrates the steps performed on the incoming data in the single pole depth filter 45. The input digital data is applied to a summing step 63 to arrive at $Z_0$. The value subtracted in the summing step 63 is the value of $Z_1$ times $B_1$, computed in a multiplying step 65. $B_1$ is a predetermined constant. $Z_1$ is the value of $Z_0$ determined for the preceding depth increment. This value $Z_0$ was retained by the delay step 67 from the preceding two inch depth increment. The value $Z_0$ is multiplied by another constant $A_0$, in multiplying step 69. The value $Z_1$ is multiplied by another constant $A_1$ in the multiplying step 71. In the summation step 73, the output will be equal to $Z_1$ times $A_1$, plus $A_0$ times $Z_0$. The equation below expresses the steps used in the single pole filter of FIG. 5:

$Z_0 = IN - B_1 * Z_1$
$Out = A_0 * Z_0 + A_1 * Z_1$
$Z_1 = Z_0$ (filter memory for next depth increment)

Figure 6:
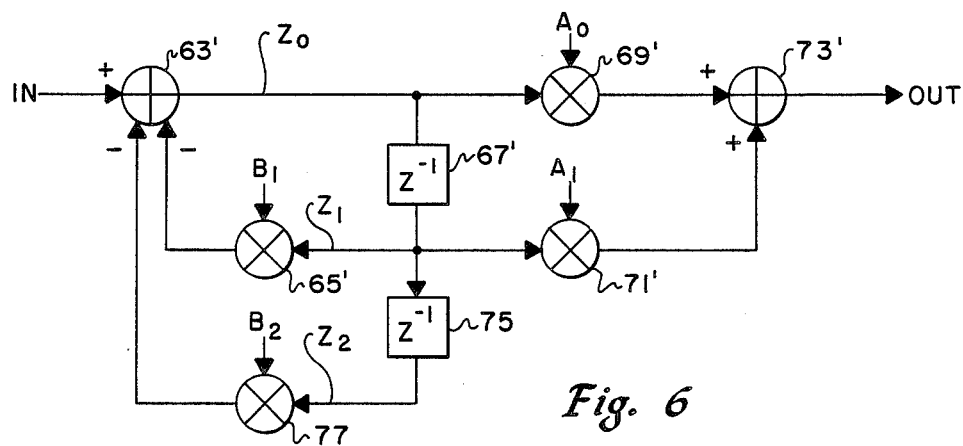
FIG. 6 is a schematic illustrating another of the depth filters used in calculating earth formation characteristics for the system of FIG. 4.

Referring again to FIG. 7, the two pole filter is used for filters 51, 53, 55 and 61. For a constant step input of amplitude one over ten two inch increments, a portion of the output will be greater than one, and another portion less than one. Constants are calculated to achieve the desired amount of damping and overtravel. FIG. 6 represents the steps taken. The prime symbols indicate the same steps as used with the single pole filter of FIG. 5. The two pole filter has in addition a second depth delay step 75 to yield $Z_2$, and a multiplying step 77 for multiplying $Z_2$ against another constant $B_2$.

The values $Z_1$ times $B_1$ and $Z_2$ times $B_2$ are subtracted from the input data to yield $Z_0$. $Z_1$ is the $Z_0$ value previously calculated, and delayed by the step 67'. $Z_2$ is the value of $Z_1$ previously calculated, and retained from the preceding depth increment by the delay step 75. The output will be equal to the constant $A_1$ times $Z_1$ plus $A_0$ times $Z_0$. The equations for the steps are set forth below:

$Z_0 = IN - B_1 * Z_1 - B_2 * Z_2$
$OUT = A_0 * Z_0 + A_1 Z_1$
$Z_2 = Z_1$ $Z_1 = Z_0$

The invention has significant advantages. Using the cumulative curve allows one to calculate the formation lifetime characteristic without making assumptions for background. Using total counts, rather than count rates, avoids having to directly measure count rate. The cumulative counts in each bin reduces statistical variations from bin to bin. Calculating a new formation lifetime constant, and varying the pulse firing rate accordingly, assures that the delays between pulses will be appropriately sized for achieving a good response for the various formations encountered while logging.

While the invention has been shown in only one of its forms, it should be apparent to those skilled in the art, that it is not so limited but is susceptible to various changes without departing from the scope of the invention.

I claim:

1. A method of measuring earth formation characteristics, comprising in combination:
   repetitively irradiating the earth formations with pulses of neutrons; then
   detecting gamma rays emanating from the irradiated formations; and
   cumulatively counting for a preselected counting period following each pulse the total gamma rays detected in a plurality of separate time bins, and adding the total count from each preceding bin to the count from a next bin, the cumulative counts for each pulse defining points on a cumulative count versus time curve which has a mathematical expression; and
   computing from the cumulative counts of the time bins variables in the mathematical expression which correspond to characteristics of the earth formations.

2. A method of measuring earth formation characteristics, comprising in combination:
   repetitively irradiating the earth formations with a number of pulses of neutrons, the pulses being of a selected duration; then
   detecting gamma rays emanating from the irradiated formations;
   after a selected interval following each pulse and before a next pulse, cumulatively counting for a preselected counting period the total gamma rays detected in a plurality of separate time bins, adding the total count from each preceding bin to the count from a next bin, the cumulative counts for each pulse defining points on a cumulative count versus time curve which has a mathematical expression; then
   after a selected depth increment transmitting the total counts for each time bin to a processor;
   dividing with the processor the total counts for each time bin by the number of pulses fired during the depth increment to determine an average cumulative counts for each time bin; and
   computing with the processor based on the average cumulative counts for the time bins, variables in the mathematical expression which correspond to characteristics of the earth formations.

3. The method according to claim 2 wherein one of the variables computed is a formation thermal decay time, and the method further comprises:
   varying the time between pulses for a next depth increment proportional to the thermal decay time computed for a preceding depth increment.

4. The method according to claim 2 wherein one of the variables computed is a formation thermal decay time, the method further comprising:
   varying the duration of each pulse and the time between the pulses in proportion to the formation decay time computed for a preceding depth increment.

5. A method of measuring earth formation characteristics, comprising in combination:
   drawing a pulsed neutron source and detector through a borehole;
   repetitively irradiating the earth formation with pulses of selected duration of fast neutrons from the neutron source, creating thermal neutrons due to collisions in the formations, which subsequently are captured by the formation;
   detecting gamma rays emanating from the irradiated formations as a result of the capture of thermal neutrons;
   after a selected time following each pulse and before a next pulse, cumulatively counting for a preselected counting period the total gamma rays detected in a plurality of separate time bins, cumulatively adding each bin's count to the preceding bin, the cumulative counts for each pulse defining points on a cumulative count versus time curve which has a mathematical expression with three unknown variables;
   after a selected depth increment, transmitting the total counts for all of the pulses for each time bin to a processor at the surface;
   dividing with the processor the total counts for each time bin by the number of pulses fired during the depth increment to determine average cumulative counts for each time bin;
   computing the three variables with the processor using iterative fit with the average cumulative count from each time bin, and calculating a formation thermal decay time; then
   varying the duration of the pulses and the time between pulses for a next depth increment in proportion to the thermal decay time computed for the preceding depth increment.

* * * * *